(12) United States Patent
Templeton et al.

(10) Patent No.: US 8,840,173 B2
(45) Date of Patent: Sep. 23, 2014

(54) WATER SHIELD FOR A WIPER DRIVE ASSEMBLY

(75) Inventors: Kathryn Templeton, Bloomfield Hills, MI (US); Marvin Younger, White Lake, MI (US); Vinod Desai, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 511 days.

(21) Appl. No.: 13/179,918

(22) Filed: Jul. 11, 2011

(65) Prior Publication Data

US 2013/0014339 A1 Jan. 17, 2013

(51) Int. Cl.
*B60S 1/04* (2006.01)
*B60S 1/34* (2006.01)

(52) U.S. Cl.
CPC .............. *B60S 1/0433* (2013.01); *B60S 1/3493* (2013.01); *B60S 1/0447* (2013.01)
USPC ....................................... 296/192; 296/97.17

(58) Field of Classification Search
CPC .... B60S 1/0402; B60S 1/0405; B60S 1/0491; B62D 25/081; B60R 13/07
USPC .................... 296/96.15, 96.17, 192
See application file for complete search history.

(56) References Cited

U.S. PATENT DOCUMENTS

| | | | |
|---|---|---|---|
| 2,936,477 A | 5/1960 | Feller | |
| 3,843,194 A | 10/1974 | Yamada | |
| 4,783,876 A | 11/1988 | Souma et al. | |
| 5,836,042 A * | 11/1998 | Funk et al. | 296/192 |
| 6,059,294 A * | 5/2000 | Gorce | 15/250.34 |
| 6,281,649 B1 | 8/2001 | Ouellette et al. | |
| 6,719,362 B1 | 4/2004 | Johnson et al. | |
| 7,222,386 B2 | 5/2007 | Nakamura | |
| 7,657,961 B2 | 2/2010 | Shank et al. | |
| 2009/0094774 A1* | 4/2009 | Reith et al. | 15/250.31 |
| 2009/0261621 A1* | 10/2009 | Usuda | 296/192 |
| 2010/0071147 A1 | 3/2010 | Lutterodt et al. | |
| 2012/0200118 A1* | 8/2012 | Yamagishi et al. | 296/192 |
| 2013/0076071 A1* | 3/2013 | Morden et al. | 296/192 |

FOREIGN PATENT DOCUMENTS

| | | | |
|---|---|---|---|
| FR | 2788250 A1 * | 2/2001 | |
| JP | 2000085541 | 3/2000 | |
| JP | 2002127874 | 5/2002 | |
| JP | 2007099137 | 4/2007 | |

OTHER PUBLICATIONS

Machine Tranlation of FR2877250A1, printed from the EPO website, Feb. 27, 2014.*
Nissan Altima Drive Assembly Color Photograph, 2008, 1 pg.
Mazda Drive Assembly Color Photograph, Jun. 2009, 1 pg.

* cited by examiner

*Primary Examiner* — Jason S Morrow
(74) *Attorney, Agent, or Firm* — Young, Basile, Hanlon & MacFarlane, P.C.

(57) ABSTRACT

A cover member for a wiper drive assembly has a body portion configured to extend across and obscure the wiper drive assembly from a plan view with the body portion defining first and second pivot apertures. First and second grommets are each positioned within a respective one of the first and second pivot apertures and configured to receive and sealingly engage a pivot holder of the wiper drive assembly. A mounting structure is configured to attach the body portion to a structural member of the wiper drive assembly.

16 Claims, 13 Drawing Sheets

US 8,840,173 B2

WATER SHIELD FOR A WIPER DRIVE ASSEMBLY

BACKGROUND

Drive assemblies for windshield wipers on vehicles are typically located below cowl covers and adjacent to windshields. A drive assembly provides a fixed mounting point for the windshield wipers and controls the oscillating movement of windshield wipers with a linkage system. Given that modern windshield wipers are electrically powered, drive assemblies also include a motor to which a wiring harness is routed. For optimal performance, the drive assembly motor should be kept free from contact with water. Additionally, drive linkage joints typically include grease or other lubricating substances that preferably also have limited contact with water. Although drive assemblies are typically located below vehicle cowl covers, cowl covers are often not a reliable barrier to water. For example, many cowl covers include one or more openings intended to channel water and/or provide for airflow. Over time excessive contact of the drive assembly with water can lead to corrosion, detached joints due to grease loss, and/or power failures.

SUMMARY

A drive assembly cover according to the embodiments herein provides for increased protection of the drive assembly from water and moisture. The cover acts as an internal barrier between the cowl cover and the drive assembly. The cover interfaces with the drive assembly at multiple locations to ensure a rigid connection. The cover includes two openings that align with the windshield wiper pivots. The pivots pass through grommets in the cover openings in order to create water-resistant pass-throughs. An underside of the cover can also include multiple clips that are integrally formed with the cover and snap onto the frame tube of the drive assembly. A fluid channel is also formed along a rear edge of the cover to; for example, divert water from the windshield that happens to get below the cowl cover away from the drive assembly linkage joints and the drive assembly motor. The cover also shares a mounting point with the drive assembly to the adjacent vehicle body structure.

One embodiment of a cover member for a wiper drive assembly disclosed herein comprises a body portion configured to extend across and obscure the wiper drive assembly from a plan view with the body portion defining first and second pivot apertures. First and second grommets, each positioned within a respective one of the first and second pivot apertures, are configured to receive and sealingly engage a pivot holder of the wiper drive assembly. A mounting structure is configured to attach the body portion to a structural member of the wiper drive assembly.

Another embodiment of a vehicle wiper assembly is also disclosed herein. One embodiment of a vehicle wiper assembly is for a vehicle body structure that defines a mounting surface and a distal edge that at least partially overhangs the mounting surface and that has a cowl cover fixed to the vehicle body structure such that an underside of the cowl cover is spaced apart from the mounting surface and the distal edge. The cowl cover defines apertures. The vehicle wiper assembly comprises a wiper drive mechanism configured to be fixed to the mounting surface and is configured to have two pivot holders and a structural member, each pivot holder configured to axially align with a respective one of the apertures in the cowl cover. A wiper cover is configured to be situated between the wiper drive mechanism and the cowl cover and has a body portion that defines first and second pivot apertures that are axially aligned with respective ones of the two pivot holders. First and second grommets, each positioned within a respective one of the first and second pivot apertures, are configured to receive and sealingly engage a respective one of the two pivot holders of the wiper drive mechanism.

BRIEF DESCRIPTION OF THE DRAWINGS

The various features, advantages and other uses of the present apparatus will become more apparent by referring to the following detailed description and drawings in which.

DETAILED DESCRIPTION

Figure 1:
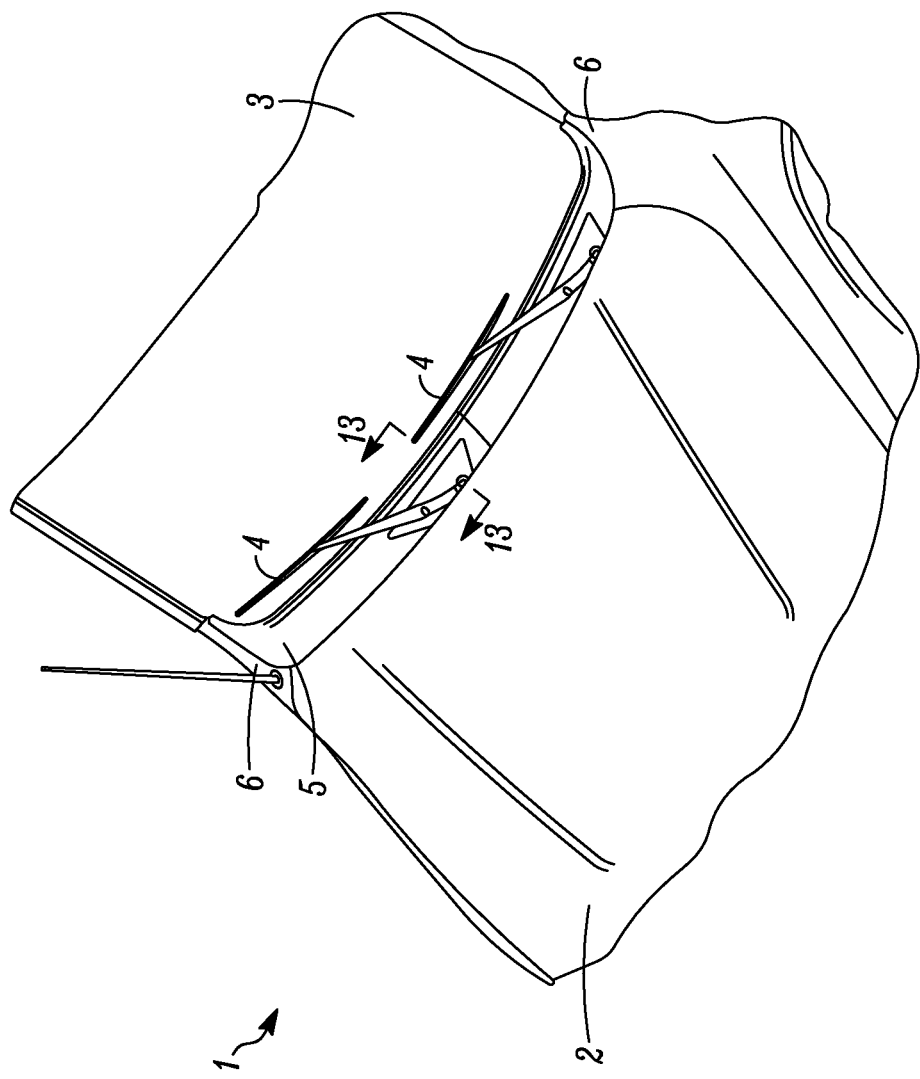
FIG. 1 is an exterior perspective view of a vehicle cowl area with the vehicle fully assembled.

FIG. 1 is a perspective view of a hood 2 and windshield 3 of a vehicle 1. A vehicle cowl area is defined between the hood 2 and windshield 3 and includes a wiper drive assembly 40 (shown in FIG. 3) for operating the wiper blades 4. A cowl cover 5 covers the vehicle cowl area including the wiper drive assembly 10 for aesthetic and operational reasons. The cowl cover 5 extends between the fender portions 6 shown in FIG. 1 and between the windshield 3 and hood 2.

Figure 2:
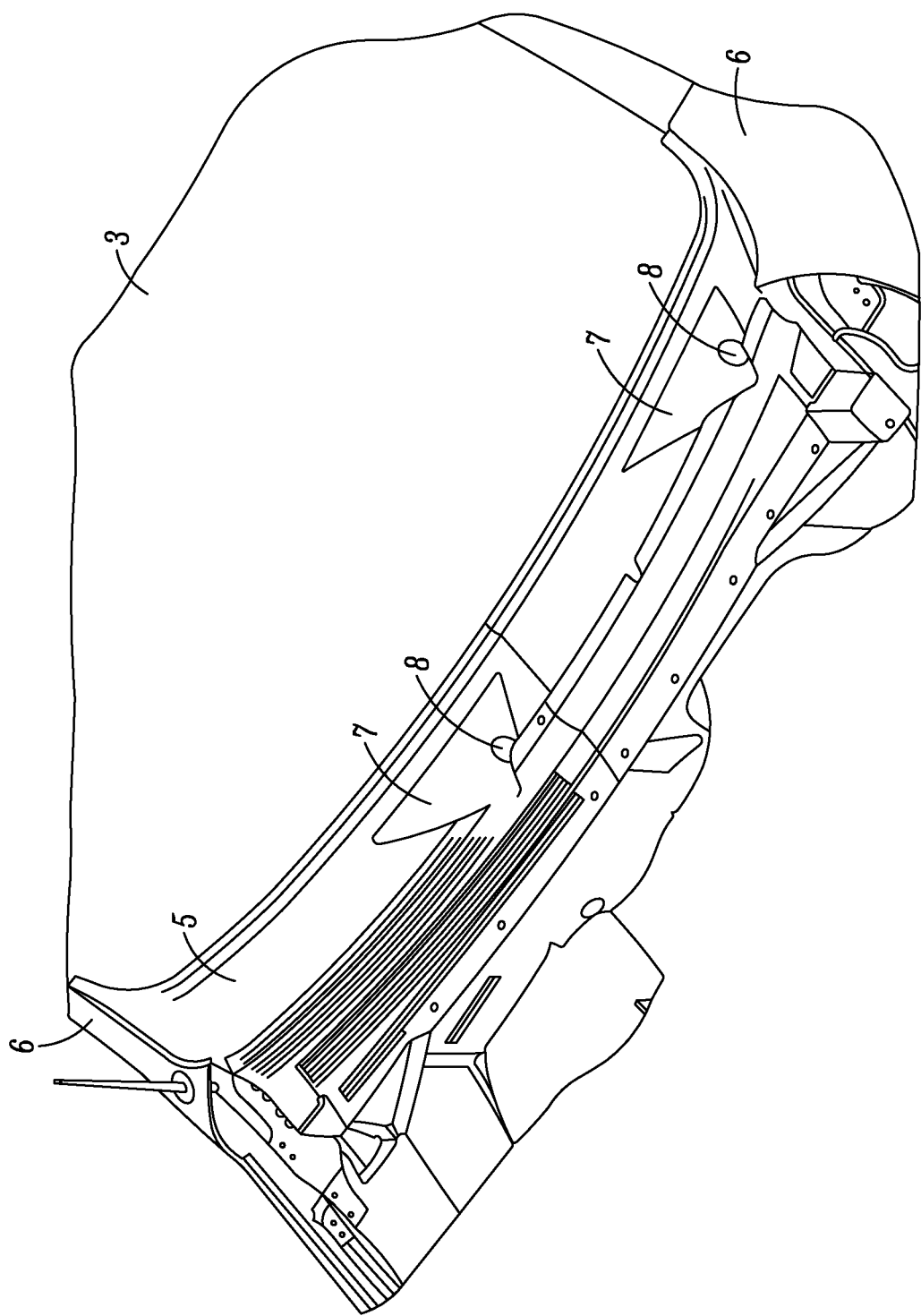
FIG. 2 is a perspective view of the vehicle cowl area with a hood and wiper arms removed.

FIG. 2 further illustrates the vehicle cowl area and the cowl cover 5 with the hood 2 and wipers 4 removed. The cowl cover 5 provides a recess 7 for each wiper blade 4 in its at-rest position. An opening 8 is provided in the cowl cover 5 through which a wiper pivot 14 (shown in FIG. 3) extends. The cowl cover 5 is fixed to a vehicle body structure 9 that has a mounting surface 16 and a distal edge 18 that at least partially overhangs the mounting structure 16. The cowl cover 5 is fixed to the vehicle body structure 9 such that an underside of the cowl cover 5 is spaced apart from the mounting surface 16 and the distal edge 18.

Figure 3:
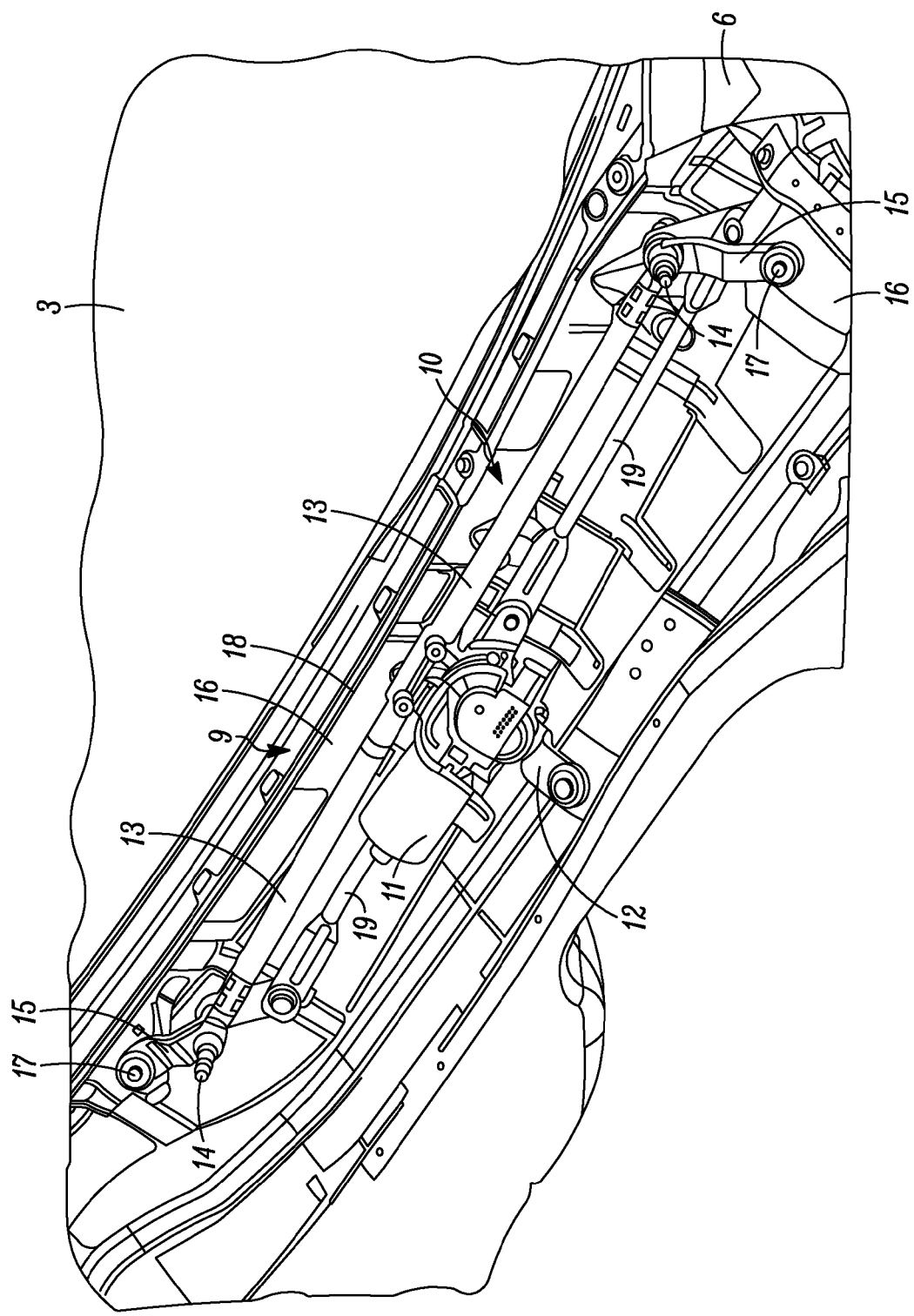
FIG. 3 is a perspective view of the vehicle cowl area with the cowl cover and the wiper drive assembly cover removed and showing a wiper drive assembly.

FIG. 3 is a perspective view of the vehicle cowl area with the cowl cover 5 removed, illustrating a configuration of the wiper drive assembly 10. The wiper drive assembly 10 has a wiper drive assembly motor 11 which is secured in place by a wiper drive assembly motor mount 12. The wiper drive assembly motor 11 is also connected to a wiper drive frame 13 which is fastened at each end to a wiper pivot 14. Bracket 15 connects the wiper drive frame 13 and wiper pivot 14 to the mounting surface 16 of the vehicle body structure 9, such as a dash structure of the vehicle, with drive fasteners 17 to secure the wiper drive assembly 10 to the mounting surface 16. Each wiper pivot 14 is connected to a wiper arm of the wiper blade 4. The wiper pivots 14 are coupled to the wiper drive assembly motor 11 with wiper drive assembly linkages 19 to operate the wiper blades 4.

Figure 4:
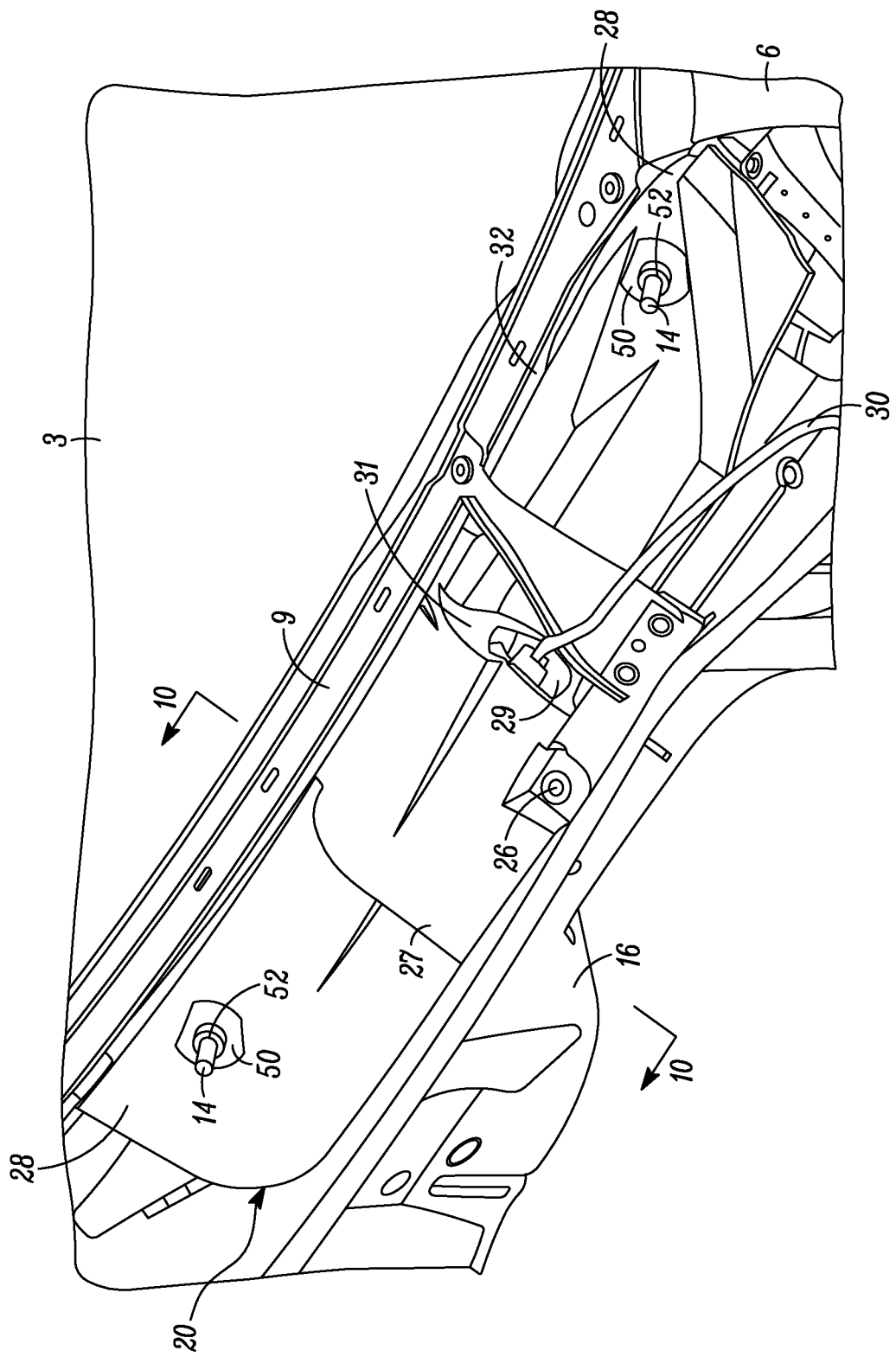
FIG. 4 is a perspective view of the vehicle cowl area showing a wiper drive assembly cover member.

For reasons such as manufacturing tolerance variations and unstable weather conditions, the cowl cover 5 alone may not desirably protect the wiper drive assembly 10 from moisture in all situations. To prevent moisture from reaching the wiper drive assembly 10 through the cowl cover 4, a wiper drive assembly cover member 20 is provided. FIG. 4 is a perspective view of the cowl area of the vehicle 1 with the wiper drive assembly cover member 20 installed, illustrating an embodiment of a wiper drive assembly cover member 20 covering the wiper drive assembly 10. Installed, the wiper drive assembly cover member 20 is positioned between the wiper drive assembly 10 and the cowl cover 5.

Figure 6:
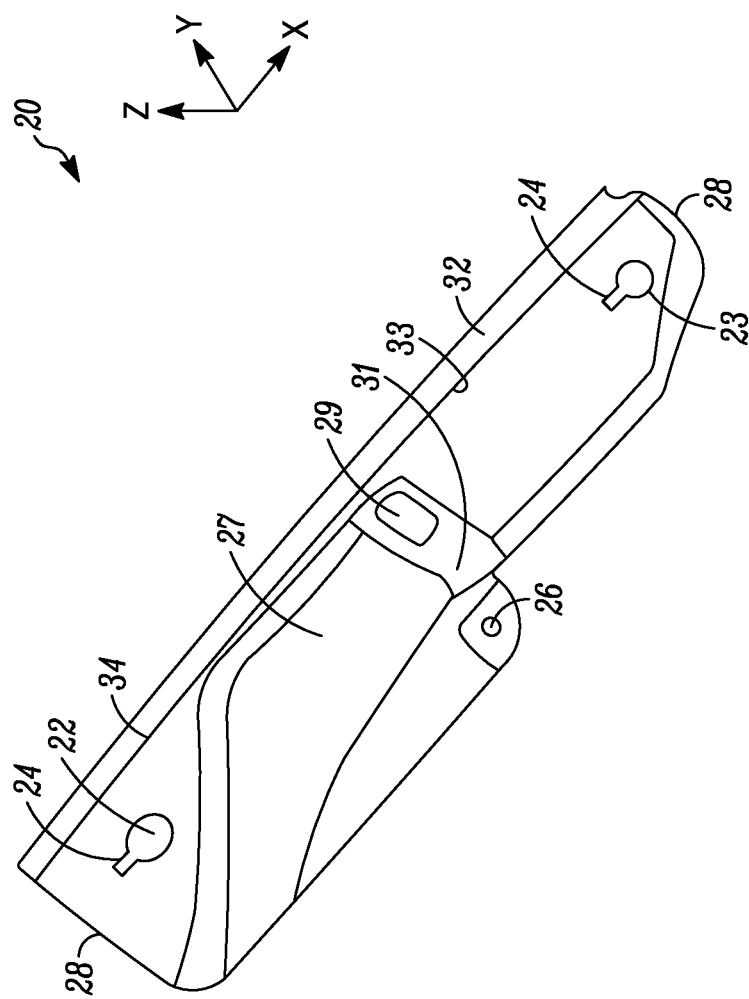
FIG. 6 is a perspective view of a body portion of a wiper drive assembly cover member.

Referring to FIG. 6, the wiper drive assembly cover member 20 has a body portion 21 configured to extend across and cover the wiper drive assembly 10 such that the wiper drive assembly 10 would be generally obscured from a plan view with the cowl cover 5 removed. The body portion 21 defines a first pivot aperture 22 and a second pivot aperture 23. Each of the first and second pivot apertures 22 and 23, respectively, includes a slot 24 extending outward from its general periphery, the function of which will be described below. The wiper drive assembly cover member 20 is secured to a structural member of the wiper drive assembly 10, such as the drive frame 13. The securement is accomplished with a mounting structure 25, described with reference to FIGS. 8-10. The wiper drive assembly cover member 20 can also share an attachment point to the vehicle body structure 9 with the wiper drive assembly 10 through aperture 26.

The body portion 21 also defines a motor enclosure 27 situated between the first and second pivot apertures 22, 23 that is raised relative to adjacent sections of the body portion 21 and that is configured to house the drive motor 11 of the wiper drive assembly 10. The motor enclosure 27 is laterally spaced apart from opposing ends 28 of the cover member 20. The motor enclosure 27 defines a harness aperture 29 configured to provide passage for a wiring harness 30 (shown in FIG. 4) there through. The harness aperture 29 is defined in a side surface 31 of the motor enclosure 27. The side surface 31 is angularly oriented with respect to the adjacent base portion 21 such that the harness aperture 29 is in a different plane of the base portion 21 than the first and second pivot apertures 22, 23. For example, the side surface 31 has a generally vertical orientation in FIG. 4.

Figure 5:
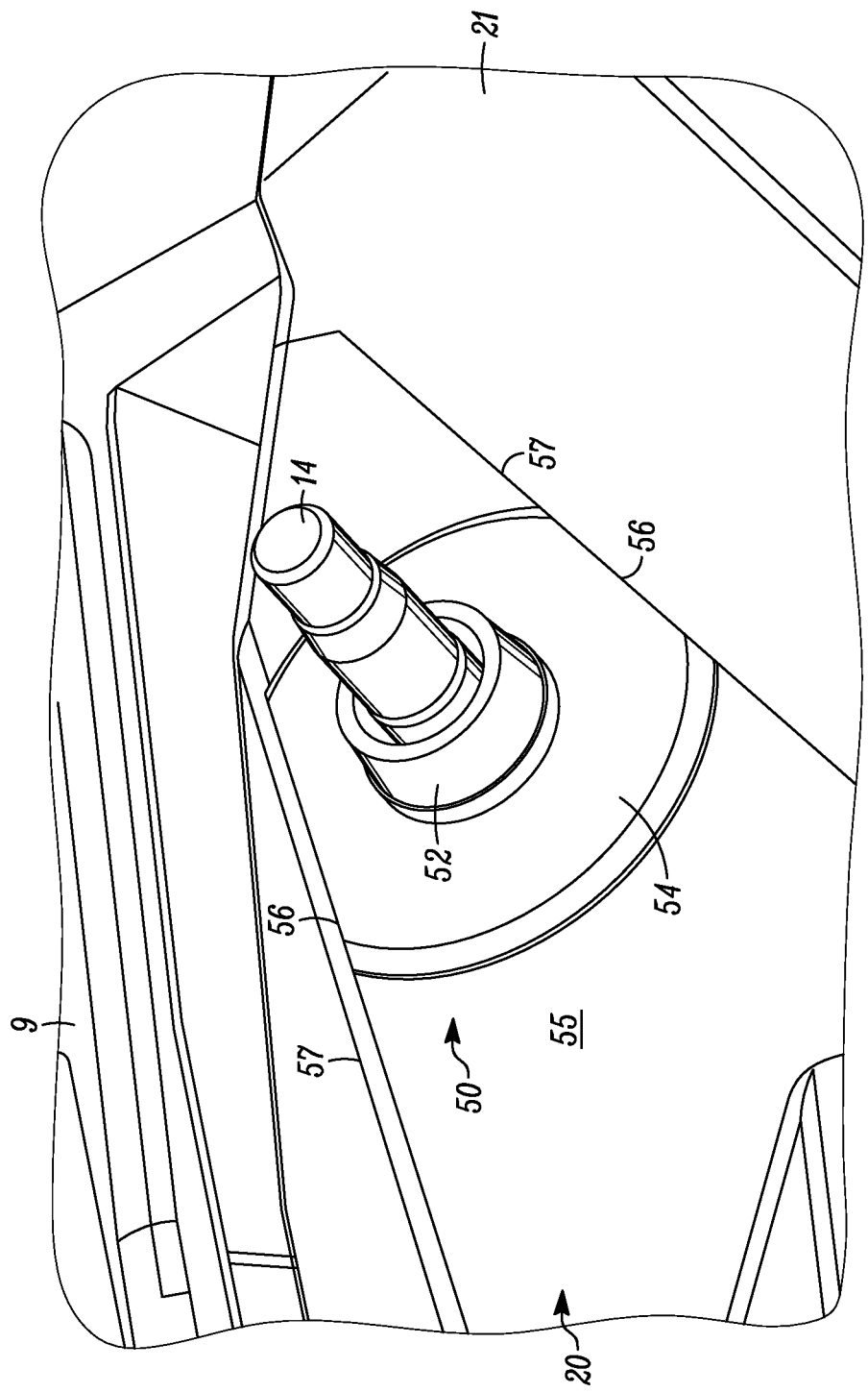
FIG. 5 is a detailed perspective view of a pass-through interface between the wiper pivot and the wiper drive assembly cover member.
Figure 7:
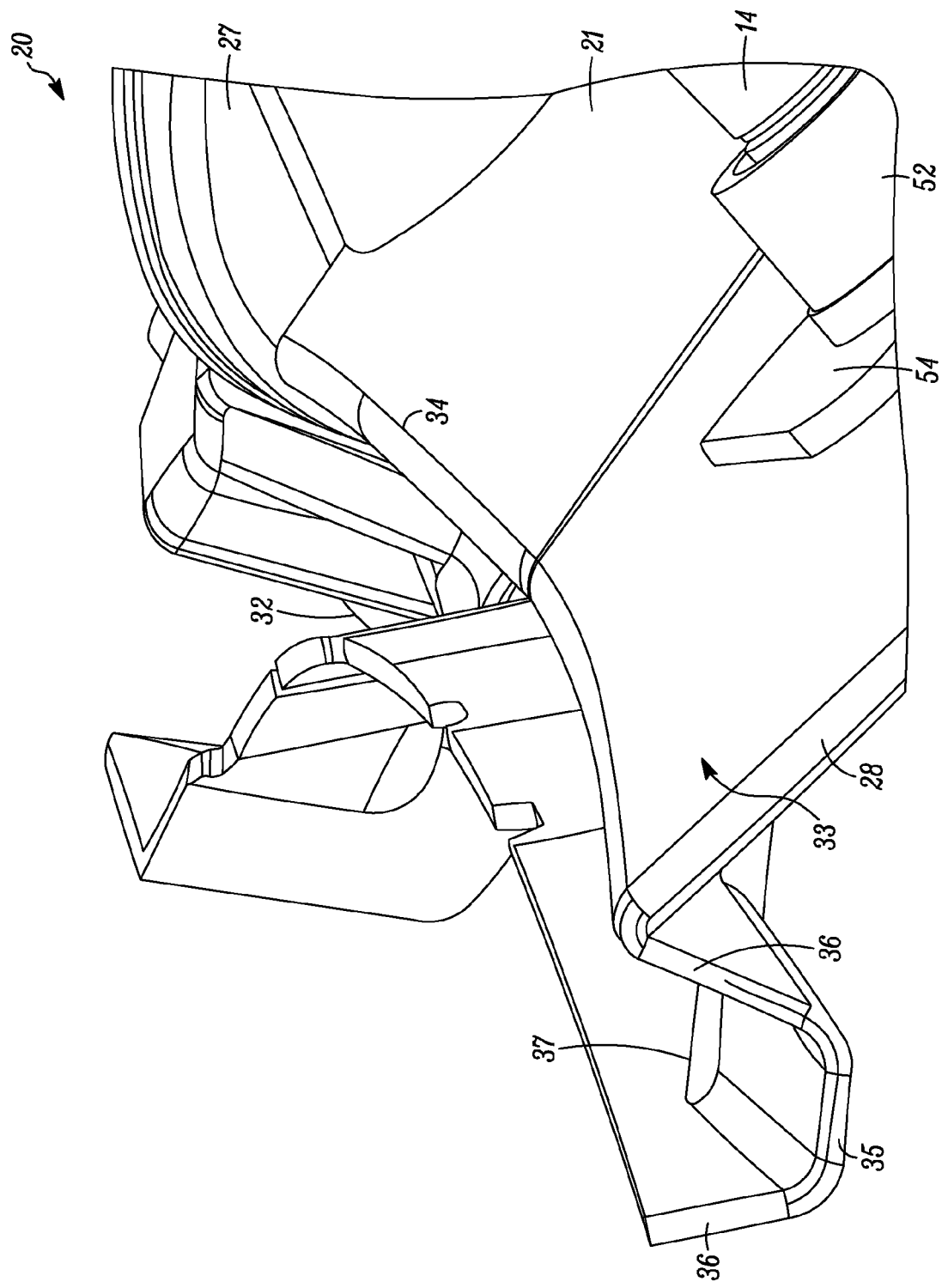
FIG. 7 is a detailed perspective view of a rear portion of the wiper drive assembly cover member showing a fluid channel.
Figure 13:
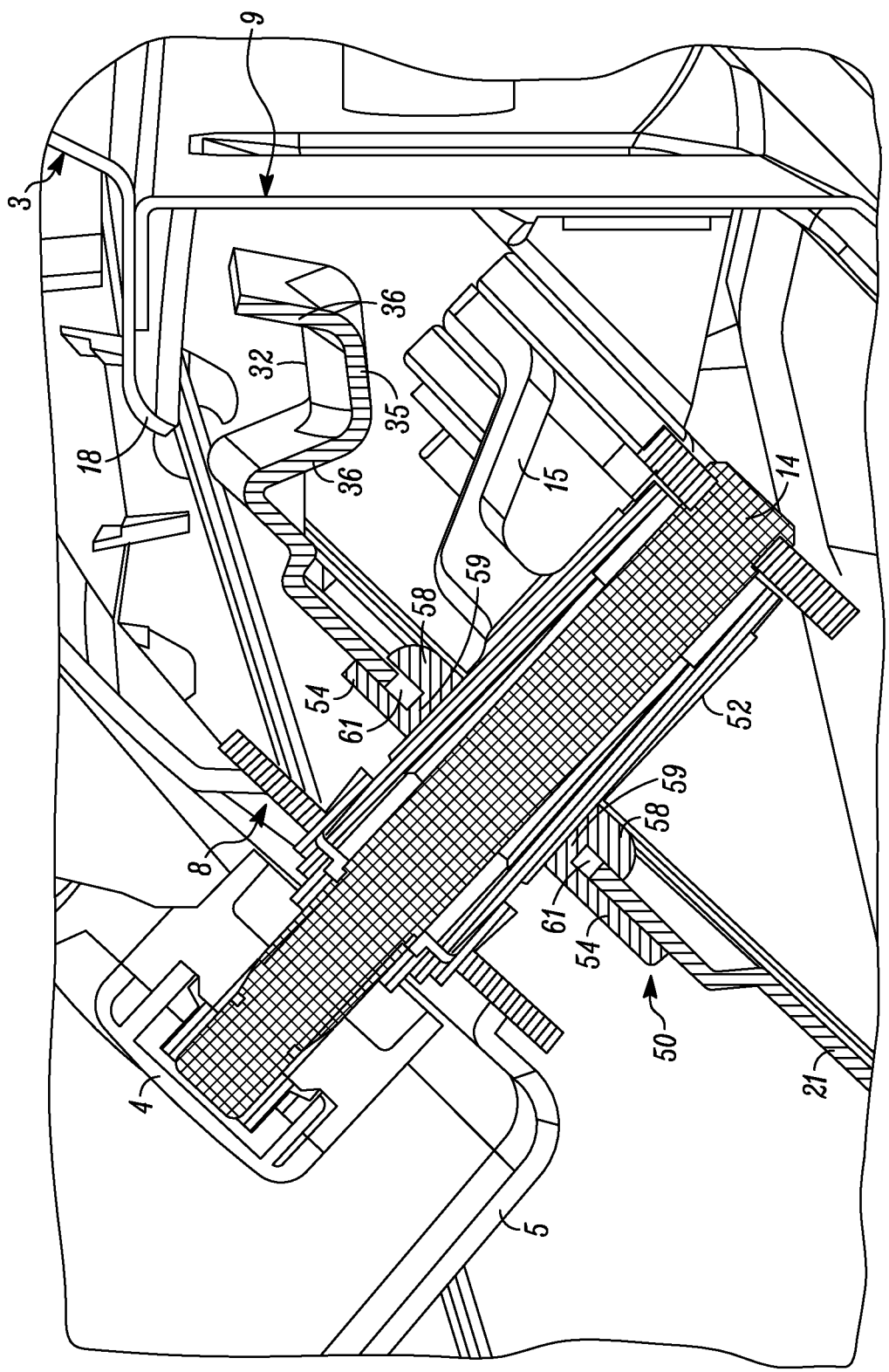
FIG. 13 an enlarged sectional view of the vehicle cowl area taken along lines 13-13 in FIG. 1.

The cover member 20 also has a fluid channel 32, best described with reference to FIG. 7. FIG. 7 is a detailed perspective view of a rear portion 33 of the wiper drive assembly cover member 20 along which the fluid channel 32 runs. The fluid channel 32 extends along a longitudinal edge 34 of the rear portion 33 of the body portion 21 and includes a base surface 35 and first and second opposed side surfaces 36. The fluid channel 32 can define a channel ridge 37 rising from the base surface 35, the channel ridge 37 configured to divert fluid toward first and second opposing ends 28 of the base portion 21. For example, the channel ridge 37 and/or the fluid channel 32 in general can slant outboard to run the fluid off of the opposing sides 28 of the cover member 20. The slope of the slant should be sufficiently large to direct the fluid but also sized so as not to interfere with the attachment of the cover member 20 to the wiper drive assembly 10 during installation. As shown in FIGS. 4, 5 and 13, the fluid channel 32 substantially aligns with the flange of the windshield 3 to catch fluid that passes between the cowl cover 5 and the windshield 3 along the flange.

Figure 8:
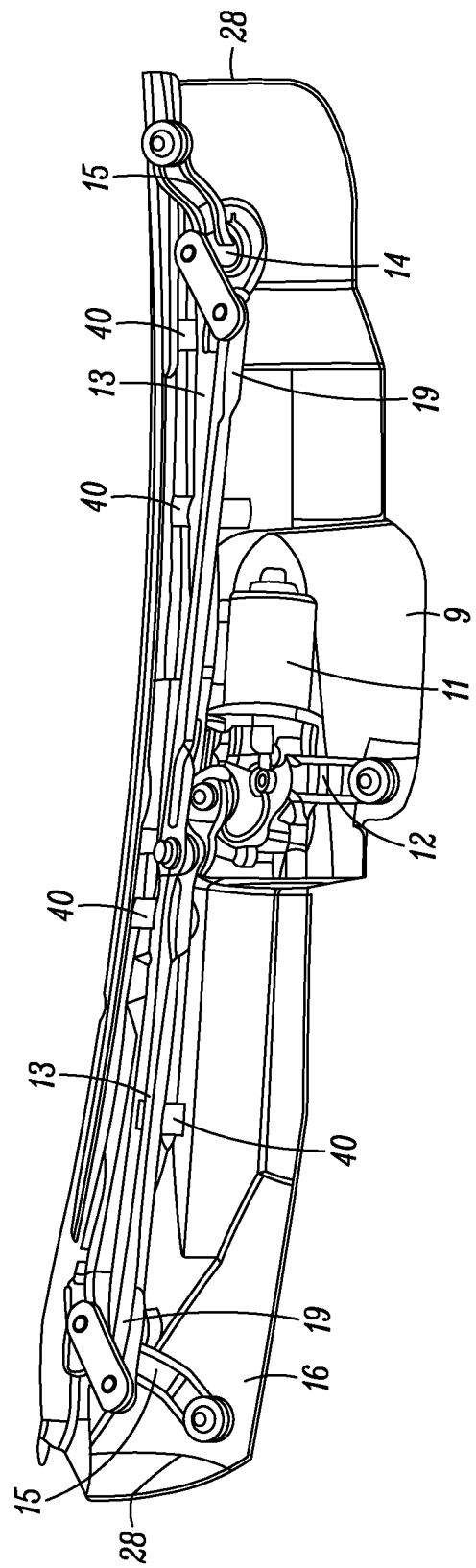
FIG. 8 is a bottom view of the wiper drive assembly cover member mounted to the wiper drive assembly.
Figure 9:
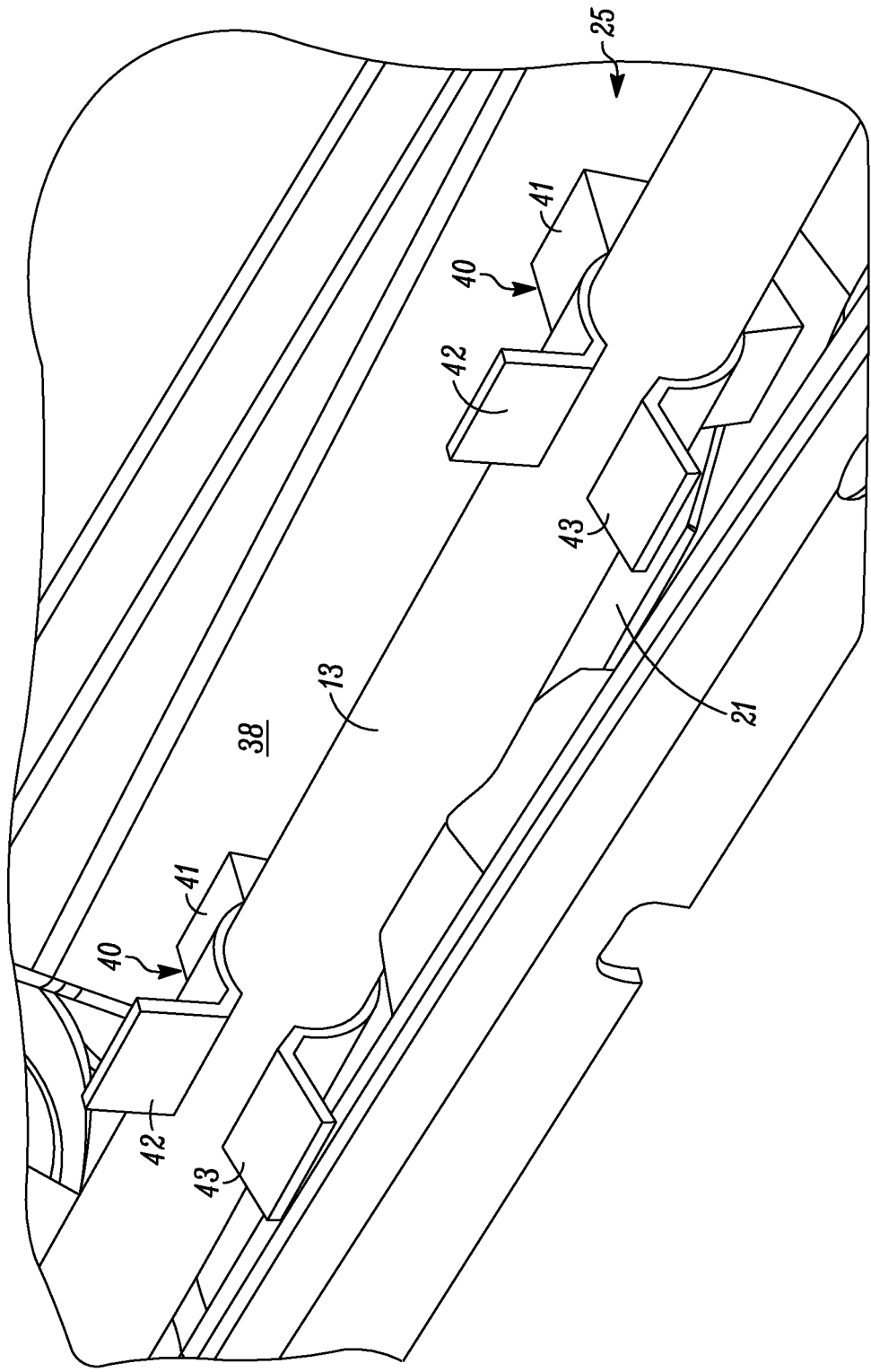
FIG. 9 is a detailed perspective view of mounting structures defined by the wiper drive assembly cover member that connect to a frame portion of the wiper drive assembly.
Figure 10:
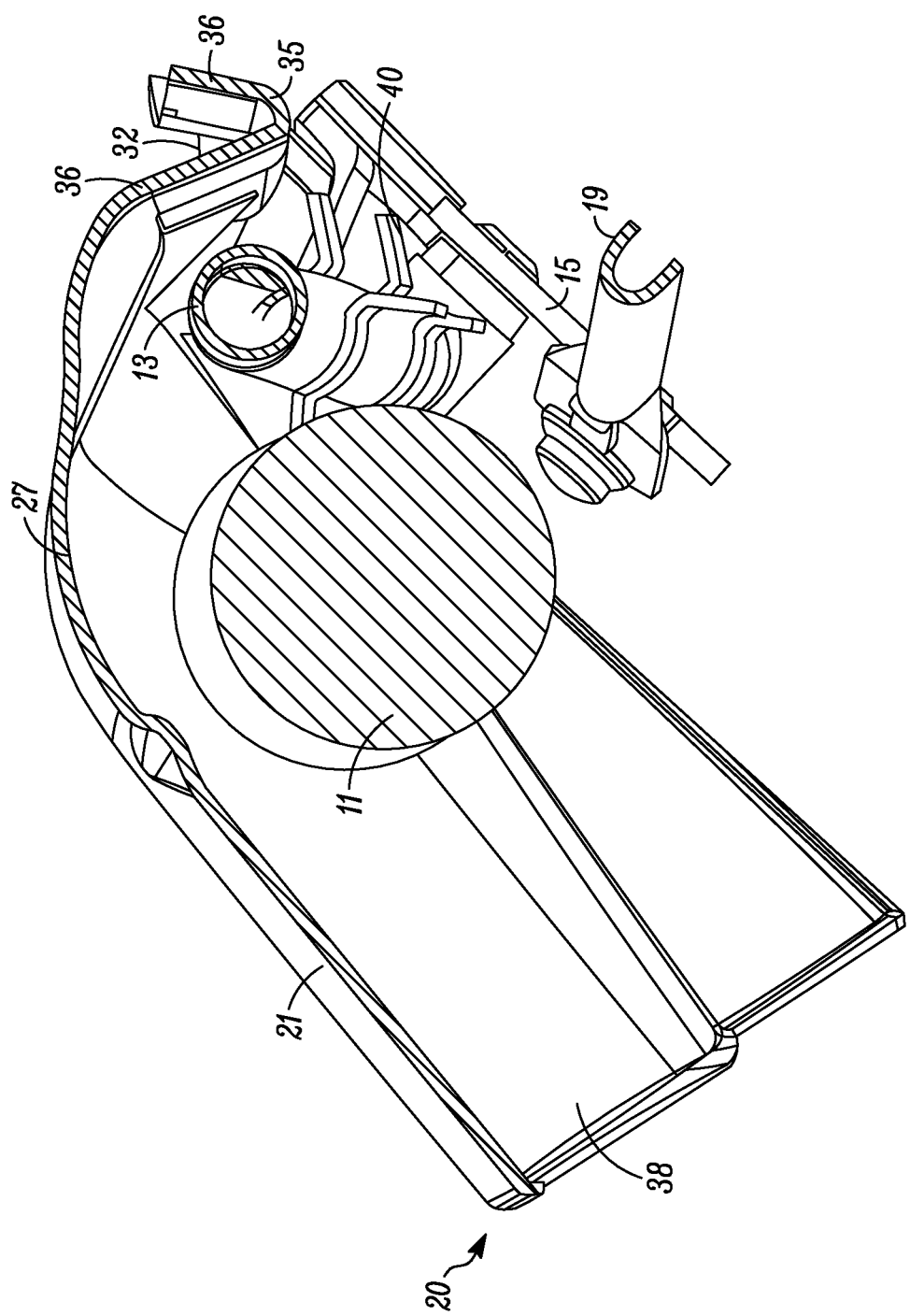
FIG. 10 is a sectional view of a wiper motor enclosure defined by the wiper drive assembly cover member taken along lines 10-10 in FIG. 4.

FIGS. 8-10 illustrate the mounting structure 25 of the wiper drive assembly cover member 20, which is on the underside 38 of the body portion 21. The mounting structure 25 comprises a plurality of spaced apart clips 40 extending from the underside 38 of the body portion 21. The clips 40 are configured to releasably engage the structural member 13 of the wiper drive assembly 10. Each of the plurality of spaced apart clips 40 can include a base portion 41 and first and second leg portions 42, 43 that extend away from the underside 38 of the base portion 41. The first and second leg portions 42, 43 can be configured to resiliently deform to engage the structural member 13 of the wiper drive assembly 10. Although four clips 40 are shown in FIG. 8, any number of clips 40 can be used to sufficiently secure the cover member 20 to the wiper drive assembly 10. The configuration described herein is not meant to be limiting. Other configurations for the mounting structure 25 are contemplated herein. For example, the first and second leg portions 42, 43 of the clips 40 can be staggered along the structural member 13 rather than paired opposite each other as illustrated.

As shown in FIGS. 4, 5 and 13 the wiper drive assembly cover member 20 also includes two grommets 50. One grommet 50 is positioned within each of the first and second pivot apertures 14 and configured to sealingly engage a pivot holder 52 of the wiper drive assembly 10. The pivot holder 52 surrounds the wiper pivot 14 and is a stationary object to which the grommet 50 can seal. The wiper pivot 14 is free to rotate within the pivot holder 52 as it is moved by the wiper drive linkages 19.

As shown in FIG. 6, the first and second pivot apertures 22, 23 can be different shapes in order to accommodate potential manufacturing tolerance variations and to allow for slight movement of the wiper drive assembly 10 relative to the cover member 20. As shown, the first pivot aperture 22 is in the shape of an oval and second pivot aperture 23 is circular. The width of the first pivot aperture 22 is the same as the diameter of the second pivot aperture 23; however, the length is slightly longer than the diameter. The shapes are provided as examples and can be other shapes that achieve the same operational effect. Despite the fact that the first and second pivot apertures 22, 23 have different shapes, a commonly shaped and sized grommet 50 can be used with each of them. Using a common grommet 50 allows for increased parts commonization, which results in cost savings.

Figure 11:
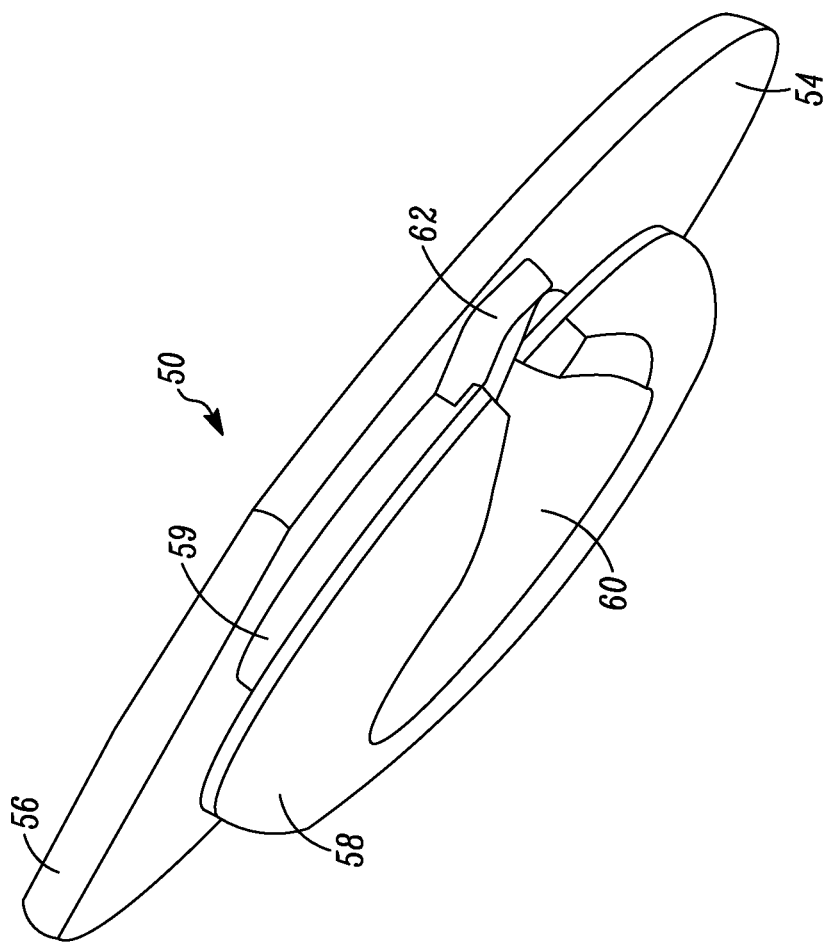
FIG. 11 is a perspective view of a grommet of the wiper drive assembly cover member.
Figure 12:
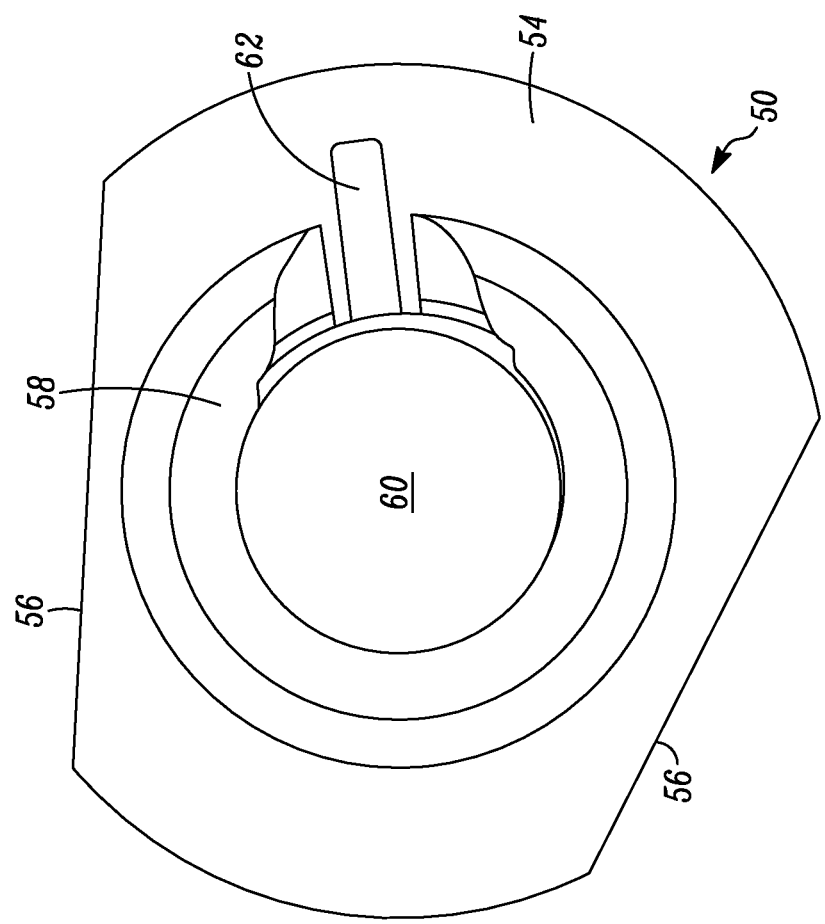
FIG. 12 is a bottom view of the grommet in FIG. 11.

FIG. 11 is a perspective view of a grommet 50 while FIG. 12 is a bottom view of the grommet 50. Each grommet 50 has an annular top flange 54 configured to lie against an upper surface 55 of the body portion 21 of the cover member 20. Depending on the exact shape of the body portion 21 designed for a particular vehicle, the top flange 54 may need to be trimmed to accommodate the allotted space. As shown in this embodiment, the top flange 54 is trimmed at trim edges 56 to accommodate the space provided by the contours 57 of the cover member 20, as seen in FIG. 5. The top flange 54 has its longest diameter sized to entirely cover the larger of the pivot apertures 22, 23.

The grommet 50 also has an annular bottom flange 58 configured to lie against the underside 38 of the body portion 21. A neck portion 59 extends between the top flange 54 and the bottom flange 58 and forms an opening 60 configured to receive and sealingly engage the pivot holder 52, as shown in FIG. 13. As shown in FIG. 13, there is a gap 61 on either side of the neck portion 59 of the grommet 50. FIG. 13 is a cross section through the larger pivot aperture, here shown as first pivot aperture 22. This gap 61 provides clearance for slight movement of the pivot holder 52 and grommet 50 relative to the cover member 20 as a result of inherent movement of the wiper drive assembly 10 and/or vibration of the vehicle during operation. In the event that gap 61 at the first pivot aperture 22 alone provides sufficient clearance for movement of the wiper drive assembly 10, a smaller gap or no gap can be present at the other pivot aperture, here the second pivot aperture 23. As illustrated in the figures, the smaller pivot aperture, here the second pivot aperture 23, is located on the driver's side of the vehicle 1. This ensures that the wiper blade 4 clearing the driver's windshield 3 is securely held, which provides for optimum water removal. Although illustrated this way, the position of the smaller and larger apertures is not limiting and can be opposite, or the apertures can be the same size, either both small or both large.

Because each grommet 50 is identically configured, including the trim edges 56, it is important for the top flange 54 to be installed with the largest diameter of the top flange positioned to cover the largest diameter of the oval shaped pivot aperture, here the first pivot aperture 22. To ensure proper alignment during installation and to prevent movement of the grommet 50 around the pivot holder 52, the grommet includes a rib 62 extending from the neck portion 59 and along the top flange 54. The rib 62 corresponds to the slot 24 shown in FIG. 6 extending from the periphery of the each of the first and second pivot apertures 22, 23. Despite the fact that the first and second pivot apertures 22, 33 are different sizes, the ribs 62 allow the grommets 50 to be properly situated with respect to the first and second pivot apertures 22, 23 when the ribs 62 are aligned with and rest in the slots 24. This aspect is shown in FIG. 4 and partially in FIG. 5.

The grommet 50 can be made from an elastic material such as rubber, nylon or other plastics that provide the requisite seal. The cover member 20 can be made from a plastic, resin or a metal. Plastic provides little weight, which is desired to keep the total vehicle weight at a minimum.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cover member for a wiper drive assembly comprising:
a body portion configured to extend across and obscure the wiper drive assembly from a plan view, the body portion defining first and second pivot apertures;
first and second grommets each positioned within a respective one of the first and second pivot apertures and configured to receive and sealingly engage a pivot holder of the wiper drive assembly;
a mounting structure configured to attach the body portion to a structural member of the wiper drive assembly; and
a fluid channel including a base surface and first and second opposed side surfaces, the fluid channel extending along a raised rear longitudinal edge of the body portion, the fluid channel configured to divert fluid contacting the cover member rearward of the raised rear longitudinal edge.

2. A cover member for a wiper drive assembly comprising:
a body portion configured to extend across and obscure the wiper drive assembly from a plan view, the body portion defining first and second pivot apertures;
first and second grommets each positioned within a respective one of the first and second pivot apertures and configured to receive and sealingly engage a pivot holder of the wiper drive assembly; and
a mounting structure configured to attach the body portion to a structural member of the wiper drive assembly, wherein the body portion further defines a motor enclosure situated between the first and second pivot apertures that is raised relative to adjacent sections of the body portion and that is configured to house a motor of the wiper drive assembly.

3. The cover member of claim 2, wherein the motor enclosure is laterally spaced apart from first and second ends of the cover member.

4. The cover member of claim 2, wherein the motor enclosure defines a harness aperture configured to provide passage for a wiring harness there through.

5. The cover member of claim 4, wherein the harness aperture is defined in a side surface of the motor enclosure, wherein the side surface is angularly oriented relative to the adjacent sections of the base portion such that the harness aperture is in a different plane from the first and second pivot apertures.

6. The cover member of claim 1, wherein the fluid channel defines a channel ridge situated on the base surface, with the channel ridge being configured to divert fluid toward first and second lateral ends of the base portion.

7. A cover member for a wiper drive assembly comprising:
a body portion configured to extend across and obscure the wiper drive assembly from a plan view, the body portion defining first and second pivot apertures;
first and second grommets each positioned within a respective one of the first and second pivot apertures and configured to receive and sealingly engage a pivot holder of the wiper drive assembly; and
a mounting structure configured to attach the body portion to a structural member of the wiper drive assembly, wherein the mounting structure comprises a plurality of spaced apart clips extending from an underside of the body portion.

8. The cover member of claim 7 further comprising a fluid channel including a base surface and first and second opposed side surfaces, the fluid channel extending along a longitudinal edge of the body portion.

9. The cover member of claim 7, wherein the clips are configured to releasably engage the structural member of the wiper drive assembly.

10. The cover member of claim 7, wherein each of the plurality of spaced apart clips includes a base portion and first and second leg portions that extend from the base portion away from the body portion of the cover member.

11. The cover member of claim 10, wherein the first and second leg portions are configured to resiliently deform to engage the structural member of the wiper drive assembly.

12. The cover member of claim 1, wherein the first and second pivot apertures are differently sized and a smaller one of the first and second pivot apertures is located on a driver's side of a vehicle including the cover member.

13. The cover member of claim 12, wherein a larger one of the first and second apertures is has an oval-shaped periphery and the smaller one of the first and second apertures has a circular periphery.

14. The cover member of claim 12, wherein each grommet has an annular top flange configured to contact an upper surface of the body portion and an annular bottom flange configured to contact an underside of the body portion, the top flange sized to entirely extend beyond a peripheral edge of a larger one of the first and second pivot apertures.

15. The cover member of claim 14, wherein each grommet includes a neck portion that extends between the top flange and the bottom flange and is configured to receive and sealingly engage a pivot holder of the wiper drive assembly, and wherein the neck portion is spaced apart from at least a portion of a peripheral edge defining a respective one of the first and second pivot apertures.

16. The cover member of claim 1, wherein each grommet has a rib and the body portion further defines slots extending from peripheries of respective ones of the first and second pivot apertures, the slots configured to receive the ribs when the grommets are installed.

\* \* \* \* \*